(12) United States Patent  (10) Patent No.: US 9,567,031 B1
Alarcon  (45) Date of Patent: Feb. 14, 2017

(54) WIDE TIRE KIT FOR MOTORCYCLES

(71) Applicant: Perry Glenn Alarcon, Colorado Springs, CO (US)

(72) Inventor: Perry Glenn Alarcon, Colorado Springs, CO (US)

( * ) Notice: Subject to any disclaimer, the term of this patent is extended or adjusted under 35 U.S.C. 154(b) by 0 days.

(21) Appl. No.: 14/929,478

(22) Filed: Nov. 2, 2015

(51) Int. Cl.
*B62K 11/04* (2006.01)
*B62K 25/28* (2006.01)

(52) U.S. Cl.
CPC ............. *B62K 25/283* (2013.01); *B62K 11/04* (2013.01)

(58) Field of Classification Search
CPC ............................... B62K 25/283; B62K 11/04
USPC .................................................. 280/284, 288
See application file for complete search history.

(56) References Cited

U.S. PATENT DOCUMENTS

| | | | | |
|---|---|---|---|---|
| 6,431,301 B1 * | 8/2002 | Forbes | .................. | B62K 3/002 180/185 |
| 6,505,847 B1 * | 1/2003 | Greene | .................. | B62K 25/20 280/284 |
| 6,863,142 B2 * | 3/2005 | Corbeil | .................. | B62M 29/00 180/185 |
| 7,040,640 B2 * | 5/2006 | Conte | ...................... | B60B 1/06 180/227 |
| 2003/0164257 A1 * | 9/2003 | Soileau | ................ | B62K 25/283 180/227 |
| 2015/0130161 A1 * | 5/2015 | Kawata | ................ | B62K 25/283 280/284 |

* cited by examiner

*Primary Examiner* — Kevin Hurley
*Assistant Examiner* — Marlon A Arce

(57) ABSTRACT

A wide tire kit for motorcycles has a swing arm frame, to which a first outboard strut and a second outboard strut are attached by a first side plate and a second side plate, respectively. An arced surface of the swing arm frame provides accommodating space for the wide tire, and the outboard struts are connected to the axle of the wheel. The wide tire kit is easily assembled, not requiring any specialized parts or labor to install.

12 Claims, 3 Drawing Sheets

WIDE TIRE KIT FOR MOTORCYCLES

FIELD OF THE INVENTION

The present invention relates generally to powered vehicles. More particularly, the present invention relates to modifications to motorcycles.

BACKGROUND OF THE INVENTION

Transportation, the movement of people, animals, goods and other items from one place to another, is an essential part of life for many people. If one stays in one's home, it is relatively difficult to support oneself unless one lives on a farm with the knowledge and resources to do so. Most people must travel to other places in order to purchase necessities such as food and clothing, to purchase other less important items such as books, toys, or accessories, and to commute to and from their place of work. There are many other reasons for a person to traverse significant distances, including taking a vacation, sightseeing, visiting relatives, making purchases, transporting items from one place to another, and going on business trips.

Transportation and has come a long way throughout the ages. In primitive times, the primary method of travel aside from on foot was riding atop animals such as horses, mules, camels and other beasts of burden. As knowledge and technology developed, new and improved forms of transportation came into existence, such as the bicycle, horse-drawn carriages and eventually the transportation methods we are familiar with today including motor vehicles such as cars, motorcycles, trucks and buses, aircraft such as fixed-wing airplanes and helicopters, trains, and watercraft such as motorboats.

A motorcycle is a two or three wheeled motor vehicle that can be said to be essentially an evolution of the bicycle or a fusion or halfway step between a bicycle and a car, since a motorcycle has the general structure of and similar operation to a bicycle but it is heavier and motorized like a car, making it a feasible transportation alternative to a car in many situations. Depending on the region, motorcycles may be less or more common than cars for the primary means of motorized transport. In Taiwan, for example, the number of motorcycles per population is purportedly twice that of automobiles per population due to lack of public transport and income levels that put automobiles out of financial reach for many. In the United States, on the other hand, motorcycles are a less common method of personal transportation than cars, but those who do own motorcycles tend to take great pride in the appearance and performance of their motorcycle. Motorcycle owners enjoy spending time on the care and maintenance of their motorcycle and may choose to make custom modifications to the motorcycle in order to achieve a unique appearance. Large motorcycles in particular are often a source of great pride for their owners, due to their distinct appearance, distinct sound and high performance. One popular motorcycle modification is to replace the original rear wheel tire with an oversize aftermarket tire, which has the effect of enhancing the expression of power and performance of the motorcycle. A wide tire modification also has the practical benefit of improving the ride of the motorcycle as well as the handling, maneuverability and traction of the motorcycle.

A wide tire cannot simply be swapped into a motorcycle with all stock parts because the dimensions of the oversized tire are too large to be compatible, so further modifications are necessary including custom support members for the wheel and drive components as well as custom drive components due to the misalignment of the drive pulley that results from installing a wider tire.

Motorcycle modifications tend to be quite costly due to the cramped nature of the drive elements and the use of custom parts and special tools. A motorcycle owner may wish to make a modification such as installation of a wide tire, but may not have the mechanical inclination or appropriate tools to do it themselves and so must take the motorcycle to a fabrication shop, which can be expensive. A kit providing all the necessary components and detailed instructions for a non-mechanically inclined motorcycle owner is desired so that the motorcycle owner may perform the modifications themselves. Modifications kits do exist, but they do not provide a complete system for the motorcycle owner to do everything on their own, forcing the owner to secure the additional services of a fabrication shop in order to complete the modification. In addition, in securing the services of a fabrication shop, the motorcycle owner is handing their motorcycle over to be worked on by someone who may not have their best interests at heart, and a real possibility exists that the outcome will not be what the owner expected or desired. Being able to perform the complete modification from beginning to end is desired so that the owner may be assured of the integrity and safety of the modification and achieve the satisfaction and comfort of knowing that they accomplished a noteworthy goal with only their own effort.

It is therefore an object of the present invention to provide a user-friendly wide tire install kit for motorcycles.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

Figure 1:
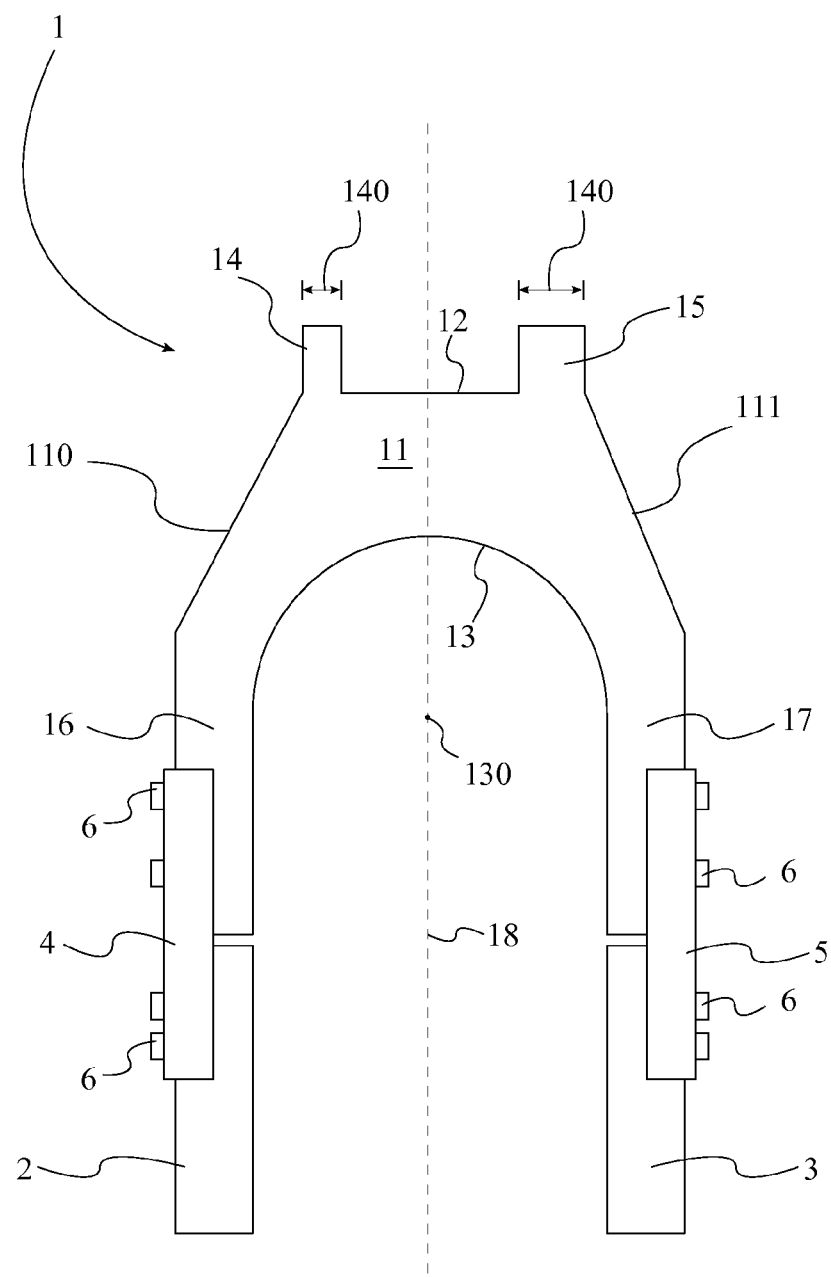
FIG. 1 is a front view of the present invention.

The present invention is an apparatus or kit comprising a plurality of components for the purpose of replacing the rear tire of a motorcycle with an oversized, wide tire. Referring to FIG. 1, the present invention generally comprises a swing arm frame 1, a first outboard strut 2, a second outboard strut 3, a first side bracket 4, and a second side bracket 5.

The swing arm frame 1 attaches to the motorcycle, and is situated above the rear tire of the motorcycle when installed. The swing arm frame 1 also supports the first outboard strut 2 and the second outboard strut 3, which are attached to the axle of the rear tire of the motorcycle. The swing arm frame 1 is the main component of the rear suspension of the motorcycle that holds the rear axle firmly while pivoting vertically to allow the suspension to absorb bumps in the road. In the preferred embodiment of the invention, the swing arm is a swinging fork type, with the two ends of the fork attaching to either side of the rear axle, and the swing arm is machined from billet aluminum, which means that the swing arm is machined from a solid block of aluminum, providing higher durability than being cast from molten aluminum.

The swing arm frame 1 comprises a central body portion 11, a mounting surface 12, an arced surface 13, a first mounting protrusion 14, a second mounting protrusion 15, a first strut attachment arm 16, a second strut attachment arm 17, and a central axis 18.

The mounting surface 12 and the arced surface 13 are positioned opposite each other on the central body portion 11 along the central axis 18. The arced surface 13 is symmetric about the central axis 18. This is important because the central axis 18 of the central body portion 11 is coincident with the central plane of rotation of the rear tire when installed on a motorcycle.

The first mounting protrusion 14 and the second mounting protrusion 15 are connected to the mounting surface 12 of the central body portion 11, and are positioned opposite each other across the central axis 18. In the preferred embodiment of the present invention, the first mounting protrusion 14 and the second mounting protrusion 15 are positioned symmetrically about the central axis 18. The first mounting protrusion 14 and the second mounting protrusion 15 allow the present invention to be mounted to the frame of the motorcycle. The first mounting protrusion 14 and the second mounting protrusion 15 are oriented parallel to each other. In the preferred embodiment of the present invention, the first mounting protrusion 14 and the second mounting protrusion 15 are rectangular, with mounting holes laterally traversing through both the first mounting protrusion 14 and the second mounting protrusion 15, perpendicular to the central axis 18. The first mounting protrusion 14 and the second mounting protrusion 15 each have a width 140 that traverses laterally in the same direction as the mounting holes, perpendicular to the central axis 18. The width 140 of the second mounting protrusion 15 is greater than the width 140 of the first mounting protrusion 14 in the preferred embodiment of the present invention.

The first strut attachment arm 16 and the second strut attachment arm 17 are connected to the mounting surface 12 opposite each other across the central axis 18. The first strut attachment arm 16 and the second strut attachment arm 17 are oriented parallel to the central axis 18. The first strut attachment arm 16 is connected to the central body portion 11 adjacent to the arced surface 13. The second strut attachment arm 17 is connected to the central body portion 11 adjacent to the arced surface 13 opposite to the first strut attachment arm 16 across the central axis 18. Thus, the first strut attachment arm 16 and the second strut attachment arm 17 are positioned symmetrically about the central axis 18. The first mounting protrusion 14 is laterally positioned between the central axis 18 and the first strut attachment arm 16, and the second mounting protrusion 15 is laterally positioned between the central axis 18 and the second strut attachment arm 17. Traversing laterally from one side of the central body portion 11 to the other, the components encountered are the first strut attachment arm 16, the first mounting protrusion 14, the central axis 18, the second mounting protrusion 15, and the second strut attachment arm 17.

The first outboard strut 2 is oriented parallel to the first strut attachment arm 16, and is attached to the first strut attachment arm 16 opposite the arced surface 13 by the first side bracket 4. Similarly, the second outboard strut 3 is oriented parallel to the second strut attachment arm 17, and is attached to the second strut attachment arm 17 opposite to the arced surface 13 by the second side bracket 5.

With the exception of the first mounting protrusion 14 and the second mounting protrusion 15, the present invention is generally symmetric about the central axis 18 as previously mentioned. The arced surface 13 is semicircular, and a focal point 130 of the arced surface 13 is positioned on the central axis 18 between the first strut attachment arm 16 and the second strut attachment arm 17.

Figure 2:
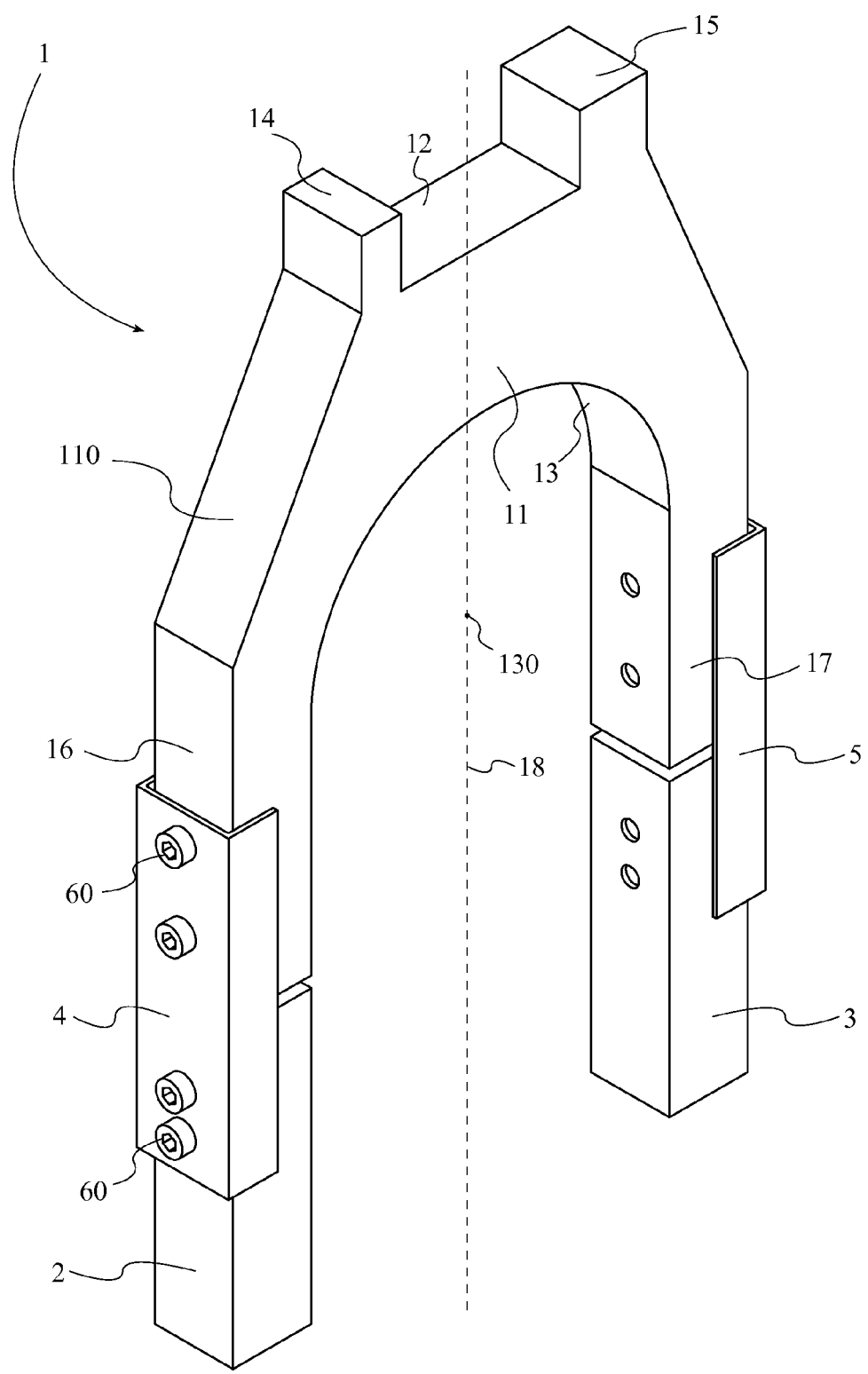
FIG. 2 is an elevated perspective view of the present invention.
Figure 3:
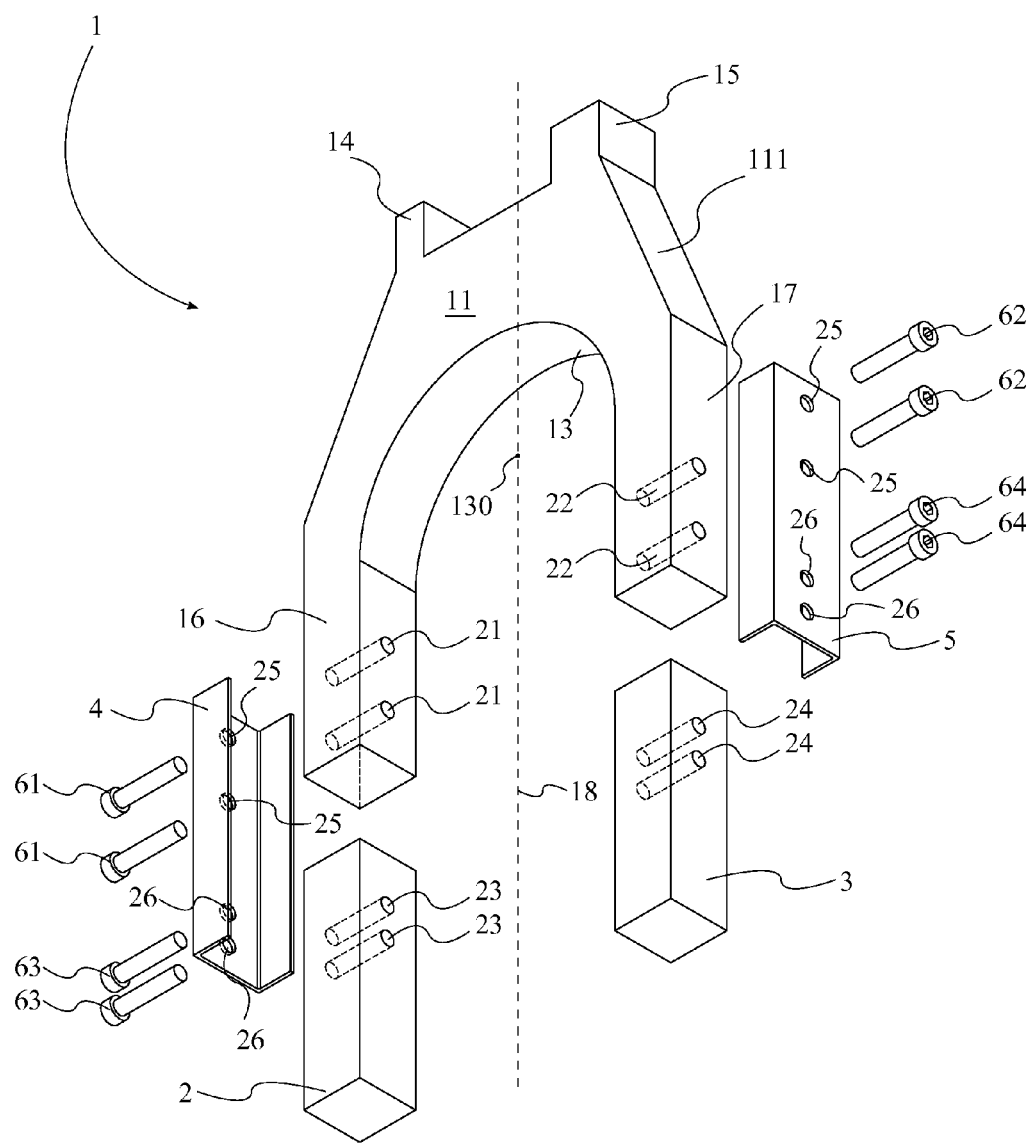
FIG. 3 is a lowered perspective exploded view of the present invention.

In the preferred embodiment of the present invention, the central body portion 11 further comprises a first slanted edge 100 and a second slanted edge 111, which can be seen in FIGS. 2-3. The first slanted edge 100 and the second slanted edge 111 are positioned opposite and symmetrically to each other across the central axis 18. The first slanted edge 100 is positioned between the mounting surface 12 and the first strut attachment arm 16, and the second slanted edge 111 is positioned between the mounting surface 12 and the second strut attachment arm 17.

The preferred embodiment of the present invention further comprises a plurality of fasteners 6. The first side bracket 4 is attached to the first strut attachment arm 16 and the first outboard strut 2 by the plurality of fasteners 6, and the second side bracket 5 is attached to the second strut attachment arm 17 and the second outboard strut 3 by the plurality of fasteners 6. Thus, the first outboard strut 2 and the second outboard strut 3 are attached to the first strut attachment arm 16 and the second attachment arm of the central body portion 11, respectively, by the first side bracket 4 and the second side bracket 5, respectively, utilizing the plurality of fasteners 6.

Though it is contemplated that any type of fastener may be utilized which accomplishes the aforementioned purpose of attaching first outboard strut 2 and the second outboard strut 3 to the central body portion 11 through the first side bracket 4 and the second side bracket 5, in the preferred embodiment of the present invention the plurality of fasteners 6 is a plurality of bolts 60.

It is additionally contemplated that the specific arrangement of the plurality of bolts 60 is not of crucial importance to the present invention, so long as the aforementioned purpose is achieved. However, in the preferred embodiment, the plurality of bolts 60 comprises a first pair of bolts 61, a second pair of bolts 62, a third pair of bolts 63, and a fourth pair of bolts 64. An exploded view of said preferred embodiment is shown in FIG. 3.

Accordingly, the first strut attachment comprises a first pair of swing arm bolt holes 21 and the second strut attachment arm 17 comprises a second pair of swing arm bolt holes 22. The first side bracket 4 and the second side bracket 5 each comprise a first pair of bracket bolt holes 25 and a second pair of bracket bolt holes 26, which are separated from each other along the first bracket and the second bracket. When assembled, the first pair of bracket bolt holes 25 is positioned adjacent to the central body portion 11, and the second pair of bracket bolt holes 26 is positioned adjacent to the respective outboard strut the respective side bracket is attached to. The first outboard strut 2 also comprises a first pair of strut bolt holes 23, and the second outboard strut 3 comprises a second pair of strut bolt holes 24.

The plurality of bolts 60 traverses through the aforementioned bolt holes in order to affix the side brackets to the central body portion 11 and the outboard struts to the side brackets. The first pair of bolts 61 traverses through the first pair of bracket bolt holes 25 of the first side bracket 4 and the first pair of swing arm bolt holes 21. The second pair of bolts 62 traverses through the first pair of bracket bolt holes 25 of the second side bracket 5 and the second pair of swing arm bolt holes 22. The third pair of bolts 63 traverses through the second pair of bracket bolt holes 26 of the first side bracket 4 and the first pair of strut bolt holes 23. The fourth pair of bolts 64 traverses through the second pair of bracket bolt holes 26 of the second side bracket 5 and the second pair of strut bolt holes 24.

In the preferred embodiment of the present invention, the plurality of bolts 60, the first pair of swing arm bolt holes 21, the second pair of swing arm bolt holes 22, the first pair of bracket bolt holes 25, the second pair of bracket bolt holes 26, the first pair of strut bolt holes 23, and the second pair of strut bolt holes 24 are oriented perpendicular to the central axis 18, laterally traversing completely through their respective component.

Although the invention has been explained in relation to its preferred embodiment, it is to be understood that many other possible modifications and variations can be made without departing from the spirit and scope of the invention as hereinafter claimed.

What is claimed is:

1. A wide tire kit for motorcycles comprises:
    a swing arm frame;
    a first outboard strut;
    a second outboard strut;
    a first side bracket;
    a second side bracket;
    the swing arm frame comprises a central body portion, a mounting surface, an arced surface, a first mounting protrusion, a second mounting protrusion, a first strut attachment arm, a second strut attachment arm, and a central axis;
    the mounting surface and the arced surface being positioned opposite each other on the central body portion along the central axis;
    the arced surface being symmetric about the central axis;
    the first mounting protrusion and the second mounting protrusion being connected to the mounting surface opposite each other across the central axis;
    the first strut attachment arm and the second strut attachment arm being oriented parallel to the central axis;
    the first strut attachment arm being connected to the central body portion adjacent to the arced surface;
    the second strut attachment arm being connected to the central body portion adjacent to the arced surface opposite the first strut attachment arm across the central axis;
    the first outboard strut being oriented parallel to the first strut attachment arm;
    the first outboard strut being attached to the first strut attachment arm opposite the arced surface by the first side bracket;
    the second outboard strut being oriented parallel to the second strut attachment arm;
    the second outboard strut being attached to the second strut attachment arm by the second side bracket opposite the arced surface.

2. The wide tire kit for motorcycles as claimed in claim 1 comprises:
    the first mounting protrusion and the second mounting protrusion being oriented parallel to each other.

3. The invention as claimed in claim 1 comprises:
    the first mounting protrusion and the second mounting protrusion each having a width, wherein the width traverses along the mounting surface perpendicularly to the central axis;
    the width of the second mounting protrusion being greater than the width of the first mounting protrusion.

4. The invention as claimed in claim 1 comprises:
    the first mounting protrusion being positioned between the central axis and the first strut attachment arm;
    the second mounting protrusion being positioned between the central axis and the second strut attachment arm.

5. The wide tire kit for motorcycles as claimed in claim 1 comprises:
    the arced surface being semicircular.

6. The invention as claimed in claim 1 comprises:
    a focal point of the arced surface being positioned on the central axis between the first strut attachment arm and the second strut attachment arm.

7. The invention as claimed in claim 1 comprises:
    the first strut attachment arm and the second strut attachment arm being positioned symmetrically about the central axis.

8. The wide tire kit for motorcycles as claimed in claim 1 comprises:
    the central body portion further comprises a first slanted edge and a second slanted edge;
    the first slanted edge and the second slanted edge being positioned opposite each other across the central axis;
    the first slanted edge being positioned between the mounting surface and the first strut attachment arm;
    the second slanted edge being positioned between the mounting surface and the second attachment arm.

9. The invention as claimed in claim 1 comprises:
    a plurality of fasteners;
    the first side bracket being attached to the first strut attachment arm and the first outboard strut by the plurality of fasteners;
    the second side bracket being attached to the second strut attachment arm and the second outboard strut by the plurality of fasteners.

10. The invention as claimed in claim 9 comprises:
    the plurality of fasteners being a plurality of bolts.

11. The invention as claimed in claim 10 comprises:
    the plurality of bolts comprises a first pair of bolts, a second pair of bolts, a third pair of bolts, and a fourth pair of bolts;
    the first strut attachment arm comprises a first pair of swing arm bolt holes;
    the second strut attachment arm comprises a second pair of swing arm bolt holes;
    the first side bracket and the second side bracket each comprise a first pair of bracket bolt holes and a second pair of bracket bolt holes;
    the first outboard strut comprises a first pair of strut bolt holes;
    the second outboard strut comprises a second pair of strut bolt holes;
    the first pair of bracket bolt holes and the second pair of bracket bolt holes being separated from each other along the first bracket and the second bracket;
    the first pair of bolts traversing through the first pair of bracket bolt holes of the first side bracket and the first pair of swing arm bolt holes;
    the second pair of bolts traversing through the first pair of bracket bolt holes of the second side bracket and the second pair of swing arm bolt holes;
    the third pair of bolts traversing through the second pair of bracket bolt holes of the first side bracket and the first pair of strut bolt holes;

the fourth pair of bolts traversing through the second pair of bracket bolt holes of the second side bracket and the second pair of strut bolt holes.

12. The invention as claimed in claim 11 comprises:

the plurality of bolts, the first pair of swing arm bolt holes, the second pair of swing arm bolt holes, the first pair of bracket bolt holes, the second pair of bracket bolt holes, the first pair of strut bolt holes, and the second pair of strut bolt holes being oriented perpendicular to the central axis.

* * * * *